United States Patent [19]

Wilson et al.

[11] Patent Number: 4,687,627
[45] Date of Patent: Aug. 18, 1987

[54] WATER DISPLACER ROD WITH HOLLOW ANNULAR SUPPORT PELLETS HAVING SEALED INTERNAL VOIDS

[75] Inventors: John F. Wilson, Murrysville Boro; Robert K. Gjertsen, Monroeville Boro; Samuel Cerni, Churchill Boro, all of Pa.

[73] Assignee: Westinghouse Electric Corp., Pittsburgh, Pa.

[21] Appl. No.: 670,853

[22] Filed: Nov. 13, 1984

[51] Int. Cl.<sup>4</sup> ............................ G21C 7/10; G21C 5/00
[52] U.S. Cl. .................................... 376/333; 376/209; 376/220; 376/420
[58] Field of Search ............... 376/333, 327, 339, 420, 376/220, 209

[56] References Cited

U.S. PATENT DOCUMENTS

| 2,852,456 | 9/1958 | Wade | 204/193.2 |
| 3,234,104 | 2/1966 | Gale et al. | 376/327 |
| 3,325,375 | 6/1967 | Mogard | 376/420 |
| 3,510,398 | 5/1970 | Wood | 376/339 |
| 4,273,616 | 6/1981 | Andrews | 376/420 |
| 4,432,934 | 2/1984 | Gjertsen et al. | |

FOREIGN PATENT DOCUMENTS

| 0054893 | 5/1977 | Japan | 376/327 |
| 0054892 | 5/1977 | Japan | 376/333 |

Primary Examiner—Harvey E. Behrend

[57] ABSTRACT

An improved water displacer rod includes an elongated hollow thin-walled tube with a pair of end plugs attached to opposite ends of the tube to hermetically seal the tube and a plurality of support pellets disposed in a stacked relationship within the tube. The pellets allow the thin-walled tube to be laterally flexible while still able to resist collapse due to high external pressure. Each pellet is preferably formed of a body having a hollow annular cross-sectional shape and a pair of end webs extends across and closing opposite ends of the body. The body defines a central void and the webs seal the void. Thus, when the pellets are stacked within the tube, each void is sealed individually one from the next. A double barrier is provided in the displacer rod by the hermetically sealed tube and the individually sealed pellets. Even if the tube should fail, moderator water will not flood the tube interior since the stacked pellets occupy and encapsulate substantially all of the empty space within the failed tube. As a result, the displacer rod containing the failed tube will still be able to perform its intended function.

13 Claims, 11 Drawing Figures

WATER DISPLACER ROD WITH HOLLOW ANNULAR SUPPORT PELLETS HAVING SEALED INTERNAL VOIDS

BACKGROUND OF THE INVENTION

1. Field of the Invention

The present invention relates generally to nuclear reactors and, more particularly, is concerned with an improved water displacer rod containing hollow sealed pellets which prevent the rod from filling with reactor coolant in the event of rod failure.

2. Description of the Prior Art

In the conventional designs of pressurized water reactors, an excessive amount of reactivity is designed into the reactor core at start-up so that as the reactivity is depleted over the life of the core there will still be sufficient reactivity to sustain core operation over a long period of time. However, since an excessive amount of reactivity is designed into the reactor core at the beginning of the core life, steps must be taken at that time to properly control it.

One technique to control reactivity is to produce an initial spectral shift which has the effect of increasing the epithermal (low reactivity) part of the neutron spectrum at the expense of the thermal (high reactivity) part. This results in production of fewer thermal neutrons and decreased fission. Then, as fission decreases during extended reactor operation, a reverse shift back to the thermal part of the neutron spectrum at the expense of the epithermal part is undertaken.

Such control technique is primarily accomplished through the use of displacer rods. As the name implies, these rods are placed in the core to initially displace some of the moderator water therein and decrease the reactivity. Then, at some point during the core cycle as reactivity is consumed, the displacement associated with these rods is removed from the core so that the amount of moderation and therewith level of reactivity in the core are increased. One approach for removing moderator water displacement is described in a U.S. patent application entitled "An Improved Water Displacer Rod Spider Assembly for a Nuclear Reactor Fuel Assembly" by Trevor A. Francis, filed Mar. 30, 1984 and assigned U.S. Ser. No. 595,154.

Several constructions of a water displacer rod are illustrated and described in U.S. Pat. No. 4,432,934 to Gjertsen et al. Referring to FIGS. 12 and 13 of this patent, the displacer rod includes an upper first tube composed, for instance, of stainless steel and a lower second tube composed, for example, of Zircaloy-4, with the tubes being interconnected by a mid extension in the for of a rod of solid Zircaloy-4. The upper first tube is sealed at its upper end by a top end plug capable of being threadably attached to a spider, while the lower second tube is sealed at its lower end by a bottom end plug which can be bullet shaped to aid in insertion of the rod into a guide thimble within one of the fuel assemblies of the reactor. In one construction of the displacer rod shown in FIG. 12, the second tube is thin walled and contains a stack of annular pellets extending from the bottom end plug to the mid rod extension which provides structural support for the tube to prevent its collapse under reactor operating pressure. In the alternative, the pellets can be of a solid instead of a hollow construction. As another alternative construction, the second tube can be thick walled and pressurized with an inert gas to prevent collapse of the rod under reactor pressure. In still another construction, the rod contains a spring instead of the stack of pellets. In any event, the construction of the displacer rod is such that it provides a low neutron absorbing rod that is capable of displacing reactor coolant-moderator when inserted into a fuel assembly.

While all of the above-cited prior constructions of the water displacer rod perform reasonably well and generally achieve their objectives under the range of operating conditions for which they were designed, a need exists for improvement in the design of the displacer rod so as to increase its general utility in fuel assemblies in a variety of slightly deformed structural states and to facilitate even more efficient use of nuclear fuel in the reactor core through employment of the spectral shift principle.

SUMMARY OF THE INVENTION

The present invention provides an improved water displacer rod designed to satisfy the aforementioned needs. Design activity leading up to the improved rod of the present invention has brought to light certain important considerations which affect the design of water displacer rods and are met by the rod construction of the present invention. First, the rod must be flexible to permit axial movement of the rod in a fuel assembly whose structure has become somewhat deformed axially, such as warped or bowed. Second, the amount of coolant flow needed to remove heat from the rod must be kept to a minimum. Third, to more precisely calculate nuclear peaking factors in the core, it must be assumed that there is no coolant in any of the rods.

Each of the three above-mentioned considerations underlie, and are satisfactorily addressed by, the improved water displaced rod construction of the present invention. As will be explained hereafter, the problems of providing adequate rod flexibility and collapse resistance, of minimizing the need for increased coolant flow to avoid rod overheating, and of minimizing nuclear peaking in adjacent fuel rods are all treated in a satisfactory manner.

First, flexibility of the rod can be increased through reduction in the moment of inertia of the rod. The most practical way to minimize the rod's inertia is to use a thin-walled cladding or tube in the rod. The use of a thin-walled tube, in turn, requires the provision of some means within it to prevent collapse of the tube due to external pressure. A stack of pellets therein bolsters the strength of the tube without adversely affecting its flexibility. Compared thereto, the use of another inner thin tube would augment resistance of the outer thin tube against collapse but would decrease its flexibility.

Second, to minimize the amount of coolant flow required to remove heat from the rod and to prevent surface boiling due to gamma heating, the mass of the pellets selected to satisfy the first consideration—flexibility and collapse resistance—must be minimized. The use of hollow or annular pellets is a practical way of minimizing the mass of the pellets without deleteriously affecting the flexibility and collapse resistance of the tube.

Third, without some additional steps being taken, the use of a thin walled tube increases the probability of clad failure and entry of coolant into the displacer rod and, to further compound the problem, the use of hollow annular pellets ensures that the entering coolant will flow throughout the empty spaces in the rod. Thus, in absence of some additional steps being taken, peaking factors will substantially increase. However, in accordance with the present invention, by individually sealing the center void of each annular pellet, substantially all of the empty space within the tube will be made impenetrable to coolant even if some of the thin walled tubes of the displacer rods should fail. Furthermore, the solid sealed ends of the individual pellets provide radial support at axially spaced locations along the rod which enhances its collapse resistance without adversely affecting its flexibility nor significantly increasing its overall mass.

Accordingly, the present invention sets forth in a fuel assembly for a nuclear reactor including an organized array of nuclear fuel rods and moderator-coolant liquid flowing along the fuel rods, at least one improved water displacer rod disposed among the fuel rods of the assembly. The improved displacer rod includes: (a) an elongated hollow hermetically-sealed thin-walled tubular member; and (b) a plurality of pellets disposed in a stacked relationship within the tubular member. Each of at least a substantial number of the pellets have (i) a body with opposite ends and a hollow annular cross-sectional shape defining a central void through the pellet, and (ii) a web extending across at least one of the opposite ends of the body so as to close the void at the one body end such that the respective voids of the bodies of the pellets disposed in the stacked relationship are enclosed individually one from the next.

More particularly, each of the pellets has a pair of webs extending across the respective ends of the pellet body so as to close the opposite body ends such that the respective voids of the bodies are sealed individually one from the next. In one form of the pellet, one of the webs is integrally connected with the pellet body at one of its opposite ends and the other of the webs is a cap attached with the pellet body at its other end. In an alternative form, each of the webs is integrally connected with the pellet body at a respective one of its opposite ends. In another alternative form, each of the webs is a cap attached to a respective one of the opposite ends of the pellet body.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
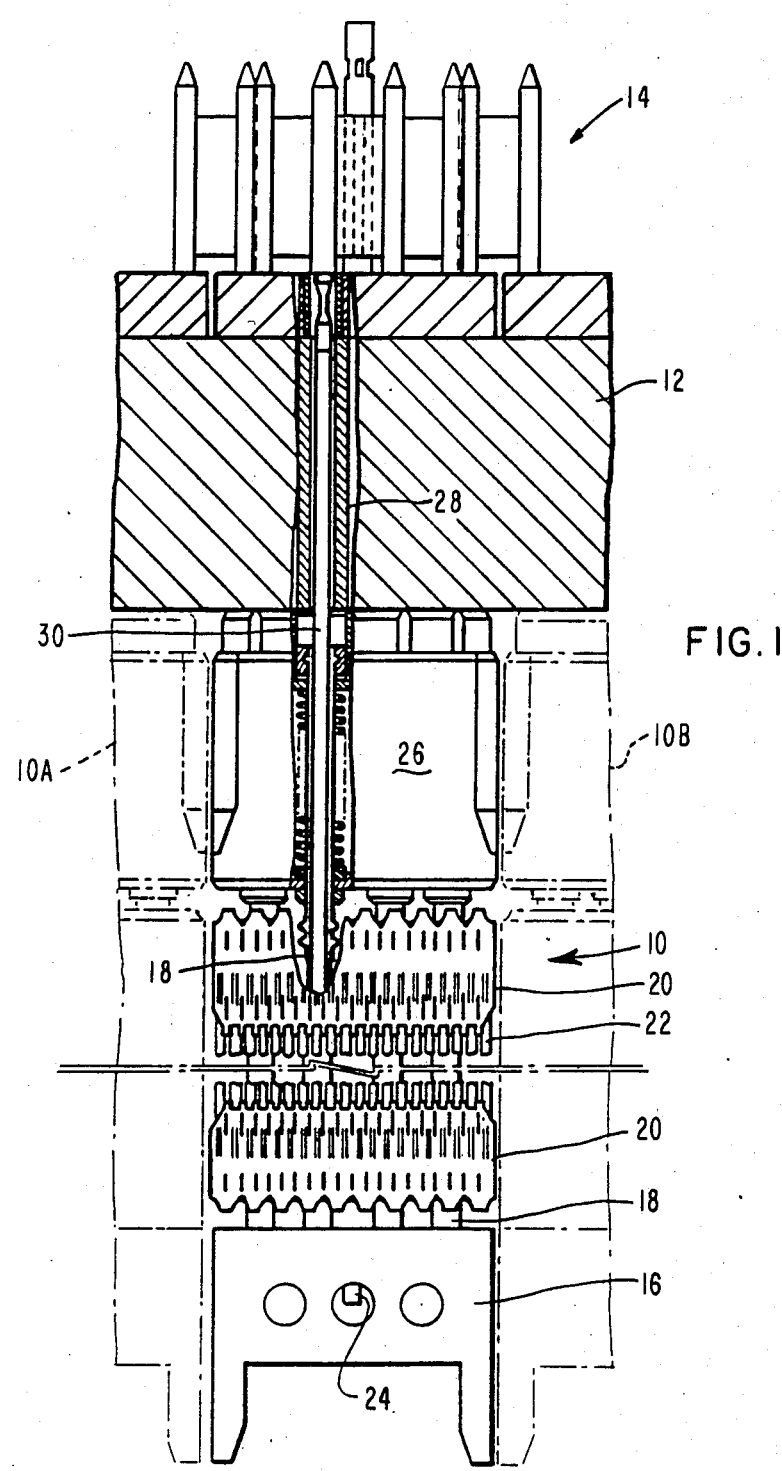
FIG. 1 is a fragmentary view of a reactor core depicting, in elevation portions of several closely spaced fuel assemblies, an upper core support plate extending across the top of the fuel assemblies, and a spider assembly disposed above the core plate and extending over adjacent fuel assemblies for supporting the water displacer rods associated with the respective fuel assemblies. Also, a central one of the fuel assemblies is illustrated in vertically foreshortened solid line form, whereas fragmentary portions of the adjacent assemblies on either side of the central fuel assembly are diagrammatically represented in dotted line form. Further, the core plate is sectioned and partly broken away and the central fuel assembly has been partly broken away to expose one of the water displacer rods which is supported by the spider assembly and incorporates the improvements of the present invention.

In the following description, like reference characters designate like or corresponding parts throughout the several views of the drawings. Also, in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown several fuel assemblies, in which the central one is generally designated by the numeral 10 while the adjacent assemblies are indicated by 10A and 10B, in combination with an upper core support plate 12 and a spider assembly 14. The upper core support plate 12 is disposed above and extends across the tops of the fuel assemblies 10,10A,10B and, in turn, has the spider assembly 14 disposed above it.

The fuel assembly 10 (it being understood that assemblies 10A and 10B are identical thereto), being shown in vertically foreshortened form in FIG. 1, basically includes a lower end structure or bottom nozzle 16 for supporting the assembly on a lower core plate (not shown) in the region of a reactor (not shown), and a number of longitudinally extending guide thimbles 18 which project upwardly from the bottom nozzle 16. The assembly 10 further includes a plurality of transverse grids 20 axially spaced along the guide thimbles 18 and an organized array of elongated fuel rods 22 transversely spaced and supported by the grids 20. Also, the assembly 10 has an instrumentation tube 24 located in the center thereof and an upper end structure or top nozzle 26 attached to the upper ends of the guide thimbles 18. With such an arrangement of parts, the fuel assembly 10 forms an integral unit capable of being conveniently handled without damaging the assembly parts.

As mentioned above, the fuel rods 22 in the array thereof in the assembly 10 are held in spaced relationship with one another by the grids 20 being spaced along the fuel assembly length. Each fuel rod 22 includes nuclear fuel pellets (not shown) and the opposite ends of the rod are closed by upper and lower end plugs (not shown). The fuel pellets composed of fissible material are responsible for creating the reactive power of the reactor. A liquid moderator/coolant such as water, or water containing boron, is pumped upwardly through the fuel assemblies of the core in order to extract heat generated therein for the production of useful work.

The upper core support plate 12, being conventional, extends across the top of the fuel assembly 10 as well as across the top of the other fuel assemblies, such as adjacent fuel assemblies 10A,10B arranged within the core. To control the fission process, the core plate 12 has a number of coolant flow openings 28 defined therethrough (only one being seen in FIG. 1) to allow coolant to pass upwardly through the core. At least some of these openings 28 are aligned over several of the guide thimbles 18 such that the improved water displacer rods 30 of the present invention (one of which is seen in FIG. 1) connected at their upper ends to the spider assembly 14 can be moved by the spider assembly at selected times during operation of the reactor down through the core plate 12 and and be inserted into the respective guide thimbes 18 of fuel assemblies 10,10A,10B so as to displace coolant from the thimbles.

Improved Water Displacer Rod

Generally speaking, water displacer rods, as their name implies, are inserted into guide thimbes in the fuel assemblies to initially displace moderator-coolant water therein and decrease the reactivity of the reactor core. Thus, the purpose of displacer rods is to displace moderator water and not to absorb neutrons. Then, at some later point during the core cycle as reactivity is consumed, the rods are removed from the core so that the amount of moderation and therewith level of reactivity in the core are increased.

In order for the displacer rods to carry out their intended purpose satisfactorily, it would seem that a primary goal might be to design the rods so that they will have a high probability of successfully withstanding the extreme pressures generated within the reactor core, which often reach, for example, 2200 psi, so as to avoid rupture and entry of water therein. However, assuming that failure of a displacer rod specifically designed to withstand high external pressure will inevitably occur, it would seem that a secondary goal might then be to design the rods so that little or none of the displaced water will be able to enter the ruptured rod. The improved water displacer rod 30 of the present invention, as illustrated in greater detail in FIG. 2, satisfies both of these primary and secondary design goals.

Figure 2:
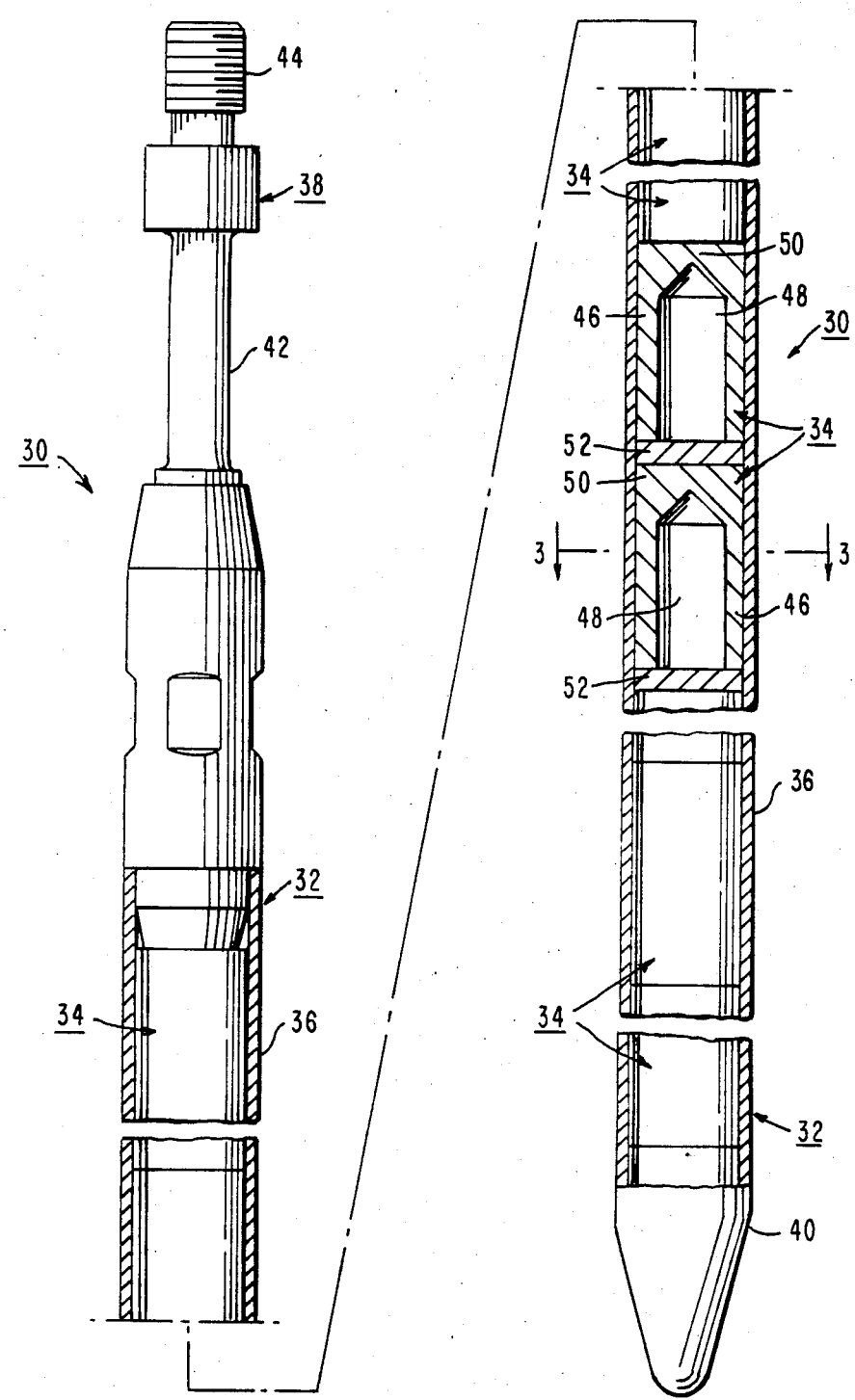
FIG. 2 is an enlarged, vertically foreshortened, partly sectional view of one of the improved water displacer rods of the present invention, being removed from the fuel assembly.
Figure 3:
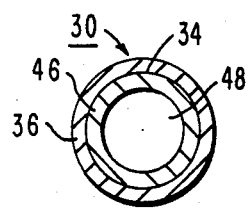
FIG. 3 is a sectional view of the displacer rod taken along line 3—3 of FIG. 2, showing one of the pellets disposed concentrically within the thin-walled tube of the displacer rod.

As seen in FIG. 2, the improved water displacer rod 30 basically includes an elongated hollow hermetically-sealed tubular member 32 and a plurality of pellets 34 disposed in a stacked relationship within the tubular member. The tubular member 32 is formed by an elongated thin-walled, metallic cladding or tube 36 having respective upper and lower end plugs 38,40 for sealing the opposite ends of the tube. The upper end plug 38 has an upwardly extending integrally formed stem section 42 with an externally threaded end 44 for connection to the spider assembly 14. The lower end plug 40 is cone-shaped. The pellets 34, tube 36 and end plugs 38,40 are all preferably composed of Zircaloy material.

The hollow tube 36 is thin-walled to minimize its moment of inertia and thereby increase its lateral flexibility which adapts the dispacer rod incorporating the tube for insertion into fuel assemblies being in a variety of structural conditions, such as ones which are warped or bowed do toextended use in the extreme environments found in nuclear reactor cores. The pellets 34 which fill the tube 36 between its end plugs 38,40 bolster its resistance to collapse due to the high pressures imposed upon the exterior of the tube while resident in the reactor core.

At least a substantial proportion of the pellets 34 of each dispacer rod 30 have the construction seen in FIGS. 2-5. The pellet 34 has a body 46 which fits concentrically within the interior surface of the tube 36 and has a hollow annular cross-sectional shape defining a central void 48 through the pellet. The use of hollow pellets minimizes the mass added to the weight of the rod 30 by the addition of the pellets. Also, a pair of solid webs 50,52 extend across and close the void 48 at the opposite ends of the pellet body 46 so as to encapsulate or seal the void of each individual pellet. Therefore, although the stack of pellets 34 augments the collapse resistance of the tube 36, should any breach of the tube still occur the central voids 48 of the pellets cannot fill with reactor coolant. Consequently, little or no water will enter the failed tube because the water has no empty space therein which is accessible to it. In effect, the rod 30 contains a double barrier against entry of moderator water into the rod interior.

Figure 6:
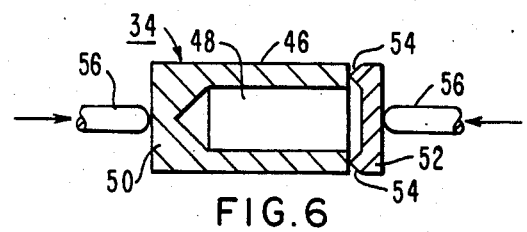
FIG. 6 is a view of the body and end cap of the pellet similar to that of FIG. 4 but prior to attachment of the cap to the body.

The body 46 and one end web 50 of the Zircaloy pellet 34 can be fabricated by drilling the central bore of void 48 in ground bar stock having the desired outside diameter. Then the other end web 52 in the form of a cap could be stamped from Zircaloy sheet material and coined to form the weld projections 54 shown in FIG. 6. The body 46 and cap 52 can then be resistance welded together using conventional techniques, such as by using welding heads 56 which apply force and electric current to both ends of the pellet 34, as diagrammatically depicted in FIG. 6. Other techniques could also be used to attach the cap 52 to body 46.

By using the end webs 50,52, the pellet 34 can be thinner walled but yet more resistant to external pressure than a purely annular pellet without solid ends due to the radial support provided by the webs at each end of the pellet 34. In summary, the annular pellet body 46 within its ends sealed by webs 50,52 encapsulates the central void 48, minimizes the mass of material in the displacer rod 30 and assures that the rod 30 will not be flooded in the event of tube rupture.

Figure 7:
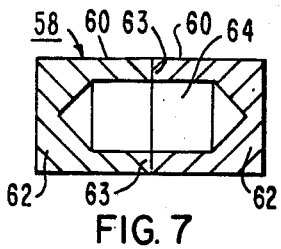
FIGS. 7 through 11 are alternative forms of the pellets which can be incorporated into alternative embodiments of the improved displacer rod of the present invention.

FIGS. 7-11 illustrate alternative forms of the pellet 34. In FIG. 7, a pellet 58 is composed of a pair of identical halves which each include a short body portion 60 and a solid web 62 integrally formed on one end of the body portion. Then the two body portions 60 are welded together at their respective open ends 63 so as to seal the void 64 defined by the welded pellet halves.

Figure 4:
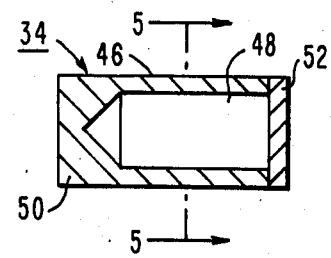
FIG. 4 is a view of one form of pellet contained in the thin-walled tube of the improved water displacer rod of FIG. 2, showing the pellet in axially sectioned form to illustrate a central void defined by a hollow annular body of the pellet and being sealed at one end by a web integrally connected with the pellet body and at the other end by a cap attached to the pellet body.
Figure 5:
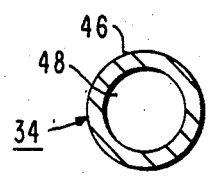
FIG. 5 is a sectional view of the annular body of the pellet as taken along line 5—5 of FIG. 4.
Figure 8:
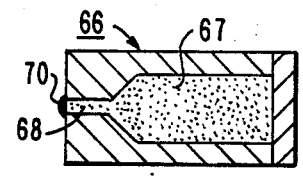

FIG. 8 illustrates a pellet 66 substantially identical to the pellet 34 of FIG. 4, but having the added feature of its void 67 being prepressurized with an inert gas through a passage 68 which is then welded shut at 70. This would allow the pellet 66 to have an even thinner wall and still withstand the same leve of external pressure as pellet 34.

Figure 9:
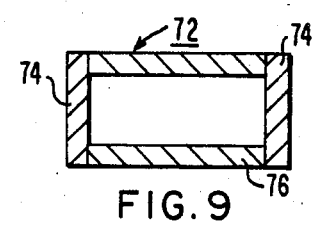

FIG. 9 shows a pellet 72 in which each of the webs is a cap 74 similar to the cap 52 of the pellet 34. As in the case of cap 52, each cap 74 is attached, such as by electric welding, to an opposite end of the hollow body 76 to form the pellet 72.

Figure 10:
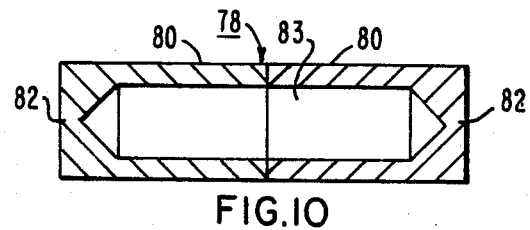

FIG. 10 illustrates a pellet 78 having the configuration of the pellet 58 of FIG. 7, but being formed of two identical pieces each of which is composed of a hollow annular body 80 with an integrally connected end solid web 82 which are generally similar to the body 46 and integral web 52 of the pellet 34. The two pieces are then welded together at their respective open ends to seal the void 83 formed by the pieces. The pellet 78 is approximately twice the length of the pellet 58 shown in FIG. 7.

Figure 11:
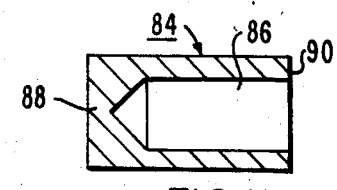

Finally, FIG. 11 shows a pellet 84 which is substantially identical to pellet 34 absent its end cap 52. The pellet 84 does not encapsulate its central void 86 but its integral web 88 does provide radial support. Also, when the pellets 84 are disposed in a stacked relationship within a displacer rod 80 with each pellet 84 oriented in the same way in the stack with respect to adjacent pellets, the end solid web 88 of each pellet 84 contacts the open end 90 of the next pellet 84 in the stack thereof such that, in effect, the respective voids 86 are individually enclosed, one from the next.

It is thought that the improved water displacer rod of the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or examplary embodiment thereof.

We claim:

1. In a fuel assembly for use in a nuclear reactor having moderator-coolant liquid flowing therein, said fuel assembly including an organized array of nuclear fuel rods and at least one improved water displacer rod disposed among said fuel rods for displacing a portion of the moderator-coolant liquid flowing along said fuel rods, said displacer rod comprising:
   (a) an elongated hollow hermetically-sealed tubular member; and
   (b) a plurality of pellets composed of a material substantially transparent to neutrons and disposed in a stacked relationship within said tubular member throughout the length of said member, each of at least a substantial number of said pellets having
      (i) a body with opposite ends and a hollow annular cross-sectional shape defining a central void through said pellet, said central void of said body being substantially transparent to neutrons, and
      (ii) a solid web extending across and connected with at least one of said opposite ends of said body so as to close said void at said one body end such that said respective voids of said bodies of said pellets disposed in said stacked relationship are enclosed individually one from the next.

2. The improved water displacer rod as recited in claim 1, wherein said tubular member is formed by an elongated tube having opposite ends and a pair of end plugs attached to said opposite ends of said tube so as to hermetically seal said tube.

3. The improved water displacer rod as recited in claim 2, wherein said elongated tube is a thin-walled tube.

4. The improved water displacer rod as recited in claim 1, wherein said web is integrally connected with said body of said pellet at one of said opposite ends thereof.

5. The improved water displacer rod as recited in claim 1, wherein said each pellet as a pair of said webs closing said respective opposite ends of said body so as to seal said void through said pellet.

6. The improved water displacer rod as recited in claim 5, wherein one of said webs is integrally connected with said pellet body at one of said opposite ends thereof and the other of said webs is a cap attached with said pellet body at the other of said opposite ends thereof so as to seal said void through said pellet.

7. The improved water displacer rod as recited in claim 5, wherein said sealed void in said pellet body is prepressurized.

8. The improved water displacer rod as recited in claim 5, wherein each of said webs is a cap attached to a respective one of said opposite ends of said pellet body.

9. The improved water displacer rod as recited in claim 5, wherein each of said webs is integrally connected with said pellet body at a respective one of said opposite ends thereof.

10. A displacer rod useful in a nuclear reactor fuel assembly solely for displacing a portion of moderator-coolant liquid flowing through said assembly, said rod comprising:
   (a) an elongated hollow thin-walled tube having opposite ends;
   (b) a pair of end plugs attached to said opposite ends of said tube so as to hermetically seal said tube; and
   (c) a plurality of pellets composed of a material substantially transparent to neutrons and disposed in a stacked relationship within said tube and throughout the length of said tube between said end plugs, each of said pellets having
      (i) a body with opposite ends and a hollow annular cross-sectional shape defining a central void through said pellet, said central void of said body being substantially transparent to neutrons, and
      (ii) a pair of solid webs extending across respective ends of said body so as to close said opposite body ends such that said respective voids of said bodies of said pellets disposed in said stacked relationship are sealed individually one from the next.

11. The improved water displacer rod as recited in claim 10, wherein each of said webs is integrally connected with said pellet body at a respective one of said opposite ends thereof.

12. The improved water displacer rod as recited in claim 10, wherein each of said webs is a cap attached to a respective one of said opposite ends of said pellet body.

13. The improved water displacer rod as recited in claim 10, wherein one of said webs is integrally connected with said pellet body at one of said opposite ends thereof and the other of said webs is a cap attached with said pellet body at the other of said opposite ends thereof.

* * * * *